United States Patent [19]
Reiss et al.

[11] Patent Number: 5,701,185
[45] Date of Patent: Dec. 23, 1997

[54] SPATIAL LIGHT MODULATOR ASSEMBLY FOR ADAPTING A PHOTOGRAPHIC PRINTER TO PRINT ELECTRONIC IMAGES

[75] Inventors: Wanda T. Reiss; James A. Ionson, both of Lexington, Mass.

[73] Assignee: Polaroid Corporation, Cambridge, Mass.

[21] Appl. No.: 342,824

[22] Filed: Nov. 21, 1994

[51] Int. Cl.⁶ ........................................... H04N 1/40
[52] U.S. Cl. .................. 358/471; 358/401; 359/237; 359/298
[58] Field of Search .................... 358/471, 474, 358/401; 359/291, 290, 298, 244, 237, 242, 245, 275; 347/285, 134; 348/771; 364/822; 355/326, 200, 210, 211

[56] References Cited

U.S. PATENT DOCUMENTS

| | | | |
|---|---|---|---|
| 3,824,604 | 7/1974 | Stein | 354/5 |
| 4,040,047 | 8/1977 | Hareng et al. | 340/324 R |
| 4,150,396 | 4/1979 | Hareng et al. | 358/60 |
| 4,185,904 | 1/1980 | Eddy | 354/80 |
| 4,229,095 | 10/1980 | Mir | 355/4 |
| 4,366,500 | 12/1982 | Kurtz et al. | 358/75 |
| 4,368,963 | 1/1983 | Stolov | 353/31 |
| 4,603,945 | 8/1986 | Fergason | 350/331 R |
| 4,786,948 | 11/1988 | Matsui | 355/40 |
| 4,846,694 | 7/1989 | Erhardt | 434/365 |
| 4,929,057 | 5/1990 | Aoki et al. | 350/333 |
| 4,950,072 | 8/1990 | Honda | 353/122 |
| 5,028,939 | 7/1991 | Hornbeck et al. | 346/160 |
| 5,043,758 | 8/1991 | Nealon | 355/40 |
| 5,105,215 | 4/1992 | Liu | 355/40 |
| 5,150,226 | 9/1992 | Takanashi et al. | 358/471 |
| 5,161,027 | 11/1992 | Liu | 358/231 |
| 5,235,437 | 8/1993 | Katagiri et al. | 358/471 |
| 5,317,409 | 5/1994 | Macocs | 348/751 |
| 5,317,436 | 5/1994 | Spitzer et al. | 359/83 |
| 5,319,402 | 6/1994 | Tsujimoto et al. | 354/106 |
| 5,457,493 | 10/1995 | Leddy et al. | 348/164 |

OTHER PUBLICATIONS

Eichenlaub, Jesse B. "A Unique Photonics System Design that Increases the Resolution of an LCD," *SPIE* vol. 1910, pp. 259–267.

*Primary Examiner*—Thomas D. Lee
*Attorney, Agent, or Firm*—Christopher P. Ricci; Joseph Stecewycz

[57] ABSTRACT

A spatial light modulator assembly is disclosed which adapts a conventional photographic printer to generate photographic images from electronic image signal such as that created by an electronic still image camera. The spatial light modulator assembly comprises a spatial light modulator ("SLM") which is connected to a computer for imprinting electronic image signal thereon where the electronic image signal is communicated from the computer. The SLM is secured within an adapter which is formed to fit in a negative carrier of the photographic printer such that an image imprinted on the SLM is positioned over a light source thereby projecting the image onto photographic paper held within the conventional photographic printer.

19 Claims, 3 Drawing Sheets

SPATIAL LIGHT MODULATOR ASSEMBLY FOR ADAPTING A PHOTOGRAPHIC PRINTER TO PRINT ELECTRONIC IMAGES

BACKGROUND OF THE INVENTION

The present invention relates generally to a spatial light modulator assembly used in combination with a photographic printer and, more particularly, the invention relates to a spatial light modulator assembly which is adapted to fit in a negative holder in a photographic printer replacing a photographic negative thus allowing the photographic printer to print electronic images onto photographic paper located therein.

A photographic printer is used in a photofinishing center in combination with a film developer. The film developer is used to develop a latent image on conventional film into a photographic negative. The photographic negative is then placed in a photographic printer where the negative is backlit to project image-bearing light onto the photographic paper to effect exposure of the photographic paper. The image projected onto the photographic paper is selectively reduced or enlarged with respect to the negative image depending upon a choice of lens systems located between the photographic negative and the photographic paper.

In such a photographic printer, each time a new negative image is to be imaged onto photographic paper, the negative must be mechanically or physically manipulated into a proper position such that the projected image is in alignment with an exposure plane of the photographic paper. Such physical manipulation can be costly in terms of production time. Large photofinishing labs known as macrolabs automatically manipulate negatives but the systems themselves have a cost in the range of hundreds of thousands of dollars and are, therefore, prohibitively expensive for many applications.

With the advent of electronic imaging cameras, a need has arisen to allow electronic still camera users to be able to print electronically recorded images onto photographic paper. This is currently accomplished by printing the electronically recorded images through a computer to a film recorder attached thereto. A problem is that a cost of buying a computer and a film recorder to simply print electronically recorded images from the electronic still camera is prohibitive.

With many conventional film photofinishing centers, minilabs and macrolabs, distributed throughout the world, it is desirable to allow a user of the electronic still camera to bring an electronic image storage medium or transmit electronic image signal to the photofinishing center for printing the electronically recorded image onto photographic paper. Thus, the image generated by the electronic still camera would be printed onto photographic paper to create a conventional hard copy photographic image in a way similar to that of conventional film.

Therefore, it is an object of this invention to provide an adapter to enable conventional film photographic printer to print electronically recorded images.

It is another object of the invention to provide an adapter that is easily inserted into a photographic printer in a minilab, or the like, to convert the minilab into an electronic image printing system and thereafter easily remove the adapter to convert the minilab back into a conventional film photofinishing system.

It is still another object of this invention to decrease an amount of physical manipulation required to place photographic images upon photographic paper.

It is still another object of the invention to decrease a cost of generating hard copy photographic images for individual users of electronic still cameras.

It is a further object of this invention to inexpensively adapt conventional film photofinishing systems to record electronic image signal on photographic paper.

These and other objects of the invention will be obvious and will appear hereinafter.

SUMMARY

The aforementioned and other objects are achieved by the invention which provides an extremely versatile apparatus for adapting a conventional photographic printer to print electronically recorded images on photographic paper. The apparatus comprises computer means, and a spatial light modulator assembly which removably replaces a photographic negative in the conventional photofinishing system when the photofinishing system is to be used to print electronically recorded images.

In non-electronic image printing operation, the conventional photographic development system operates to emit a beam of light through an aperture in a negative holder which holds a photographic negative having an image recorded thereon. The light beam is then altered by the recorded image to produce image-bearing light. The image-bearing light passes through an optical system, which includes a lens system to focus the image-bearing light, and a shutter to govern an amount of time the image-bearing light is projected onto the photographic paper to form a photographic image.

In electronic image printing operation, the photographic negative is removed and replaced with a spatial light modulator assembly which receives electronic image signal from the computer means.

The computer means reads electronic image data from an electronic image storage medium or receives the electronic image data from an external source such as distant computer network, for example. The computer means then processes and transmits the electronic image signal to the spatial light modulator assembly which comprises an adapter and spatial light modulation means.

The adapter is constructed to be removably and replaceably inserted into the negative holder of the conventional photographic printer in place of the photographic negative, thus allowing conversion between electronic image printing operation and non-electronic printing operation.

The spatial light modulation means is enclosed by the adapter and is electrically connected to said computer means. In response to the electronic image signal transmitted from the computer means, an image is imprinted on the spatial light modulation means to form a transparency thereon. The spatial light modulation means selectively allows the beam of high intensity light to pass therethrough altering the beam to produce image-bearing light. After passing through the lens system, the image-bearing light renders the image upon the photographic paper.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of photographic printing systems and can be embodied in several different forms, it is advantageously employed in connection with a minilab photographic printer. Though this is the form of the preferred embodiment and will be described as such, this embodiment should be considered illustrative and not restrictive.

Figure 1:
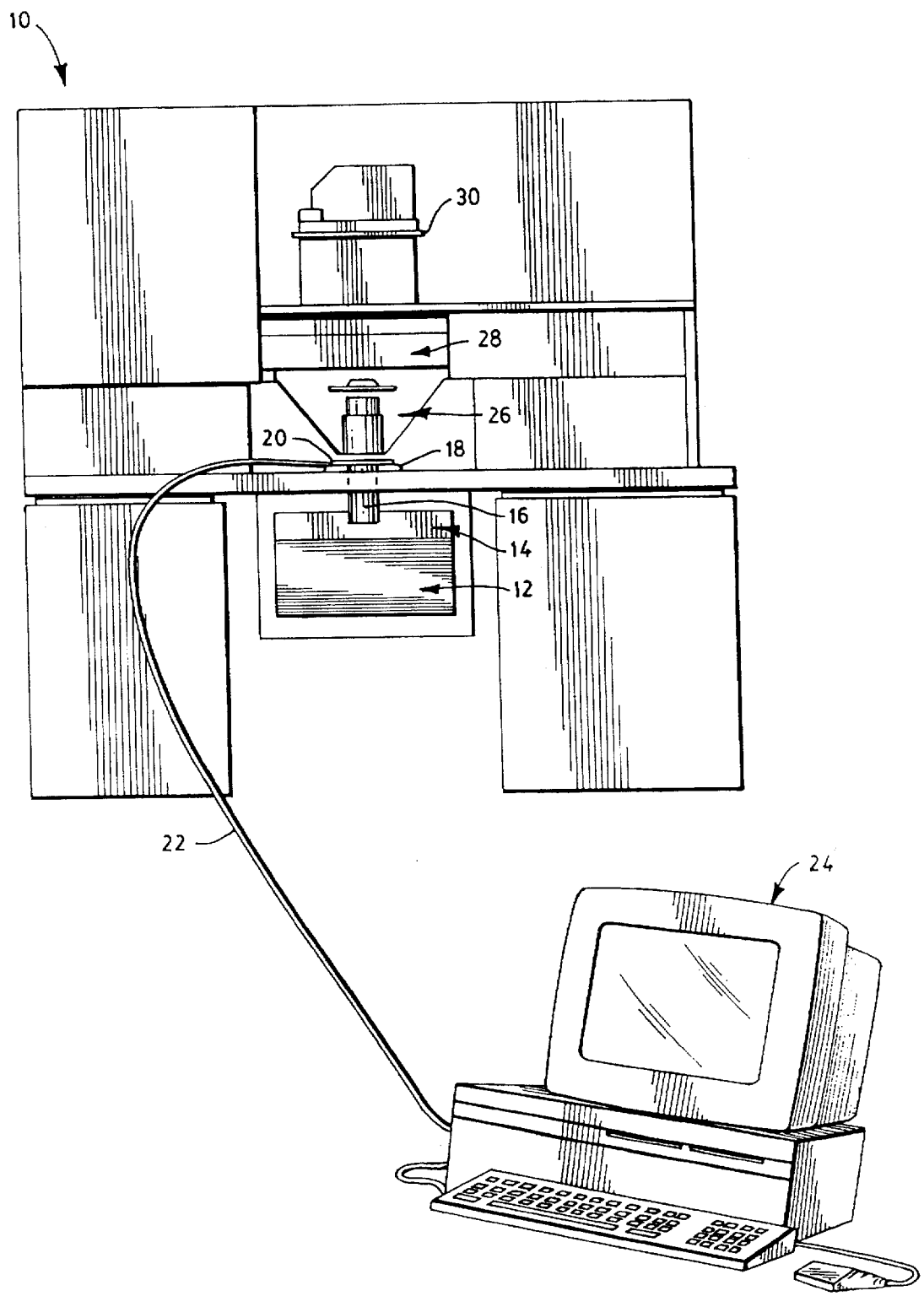
FIG. 1 shows a perspective view of a photographic printer system according with the embodiment of the present invention.

FIG. 1 depicts a minilab photographic printer for use with the present invention. A minilab 10 is a term commonly used in the industry to describe small semi-automated photofinishing centers having photographic developers and photographic printers. The present invention can also be used with amateur systems where the photographic printer is not automated and also with highly automated macrolabs without detriment to the invention.

The minilab 10 shown includes a lamp house 12 for housing a light originating device. Above the lamphouse is a cut filter 14 which determines the colors to be imaged upon the photographic paper. Light from the lamphouse 12 having passed through the cut filter 14 is then transmitted through a light tunnel 16 which has mirrored sides to optimize transmission of light up to a negative carrier 18.

The negative carrier 18 is designed for use with conventional photographic negatives such that the photographic negative slides into the negative carrier and is held securely in place while various colors of the light pass therethrough.

In electronic imaging, a negative is not produced. Instead, the image is captured and stored as electronic image signals. The electronic image signals are then transmitted to a spatial light modulator ("SLM") assembly 20 which is inserted into the negative carder 18 in place of the photographic negative.

The SLM assembly 20 has information that is sent from a computer 24 having a driver card (not shown) inserted into the computer 24. Typically, the SLM assembly 20 accepts one of standard television or VGA signals. In the preferred embodiment, the driver card is a VGA display card well known in the art transmitting a VGA signal.

The computer 24 can receive the aforementioned electronic image signals from any of various sources including, but not limited to, an electronic still camera, a magnetic or optical storage device, or directly from an electronically transmitted signal source. The computer 24 processes this information and transmits a processed image signal through a cable 22 to the SLM assembly 20. Based upon the content of the processed image signal, the SLM assembly 20 selectively alters a transmitance of each pixel in a matrix of pixels and thus forms an image thereon to allow image-bearing light to selectively pass through portions of the SLM assembly 20 representative of the image which is imprinted on the SLM assembly 20.

The image-bearing light having passed through the SLM assembly 20 then goes into a lens system 26 which determines an amount of enlargement or reduction of the image based upon a lens or lenses contained in the lens system 26. The lens system can contain a single lens or multiple lenses depending upon the implementation of the photographic printer.

A shutter unit 28 above the lens system 26 controls an exposure time. The shutter unit 28 selectively opens to allow image-beating light to pass through a shutter contained therein to expose photographic paper. A paper mask 30 is shown above the shutter assembly which isolates individual frames of the photographic paper such that exposure is restricted to a predetermined area of the photographic paper.

Figure 2:
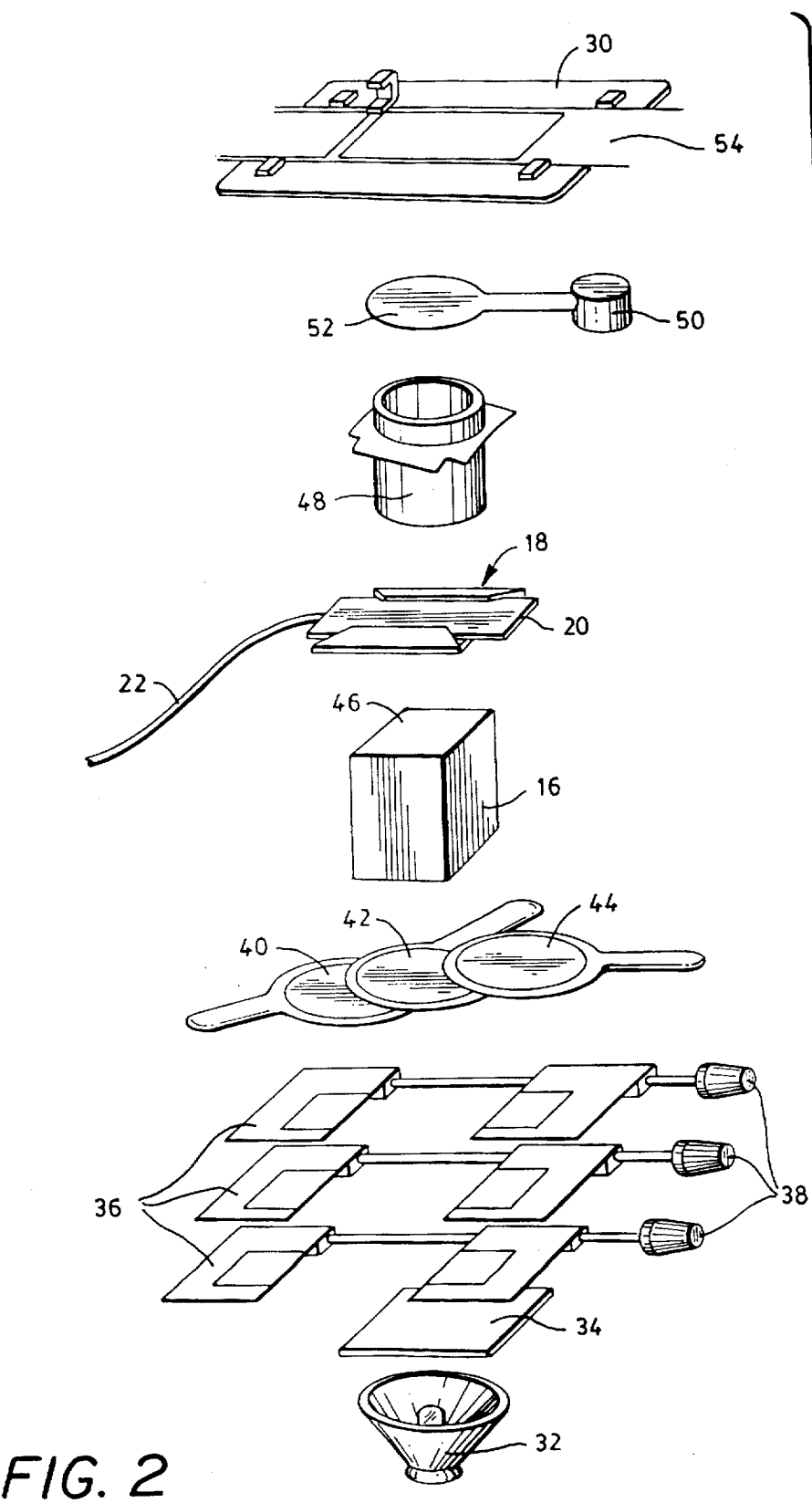
FIG. 2 shows an exploded view of individual components of the photographic printer system of FIG. 1.

The individual components of the minilab 10 are shown in more detail in FIG. 2, and will be referred to with continuing reference to FIG. 1.

The light originating device held within the lamphouse 12 is a lamp 32 which is often a halogen-type high-intensity lamp. To reduce heat produced by the lamp 32 that reaches subsequent portions of the system, a piece of heat reflecting glass 34 is located above the lamp 32.

Light from the lamp 32 then passes through a series of three dichroic filters 36. The three dichroic filters representing yellow, magenta, and cyan are individually adjustable by adjusting knobs 38 and are adjusted once for each time the lamp 32 is changed. Such an adjustment is necessary to compensate for individual color characteristics of the lamp 32.

Another set of color filters, the cut filter 14, are located above the dichroic filters 36. A yellow filter 40 is selectively movable into a path of light above the dichroic filters 36. A magenta filter 42 and a cyan filter 44 are also selectively movable into the light path such that individual colors or a sum of 2 or 3 colors of light can be projected onto the photographic paper.

The colored light having passed through the filters is now conducted by the mirror tunnel 16. The mirror tunnel 16 is essentially an elongated rectangular box lined with light reflecting mirrors such that substantially all light passing into the mirror tunnel 16 is transmitted out a top portion of the mirror tunnel 16.

The colored light emitted from the mirror tunnel 16 then passes through a diffuser 46 which redistributes the light to form a uniform light distribution over an area of the spatial light modulator or negative.

The colored light emitted from atop the diffuser 46 is then passed through a negative carrier 18 which has an aperture in its center for allowing light to pass therethrough and has opposed clamping portions for holding a photographic negative in position above an aperture. Where the photographic negative has now been replaced by the SLM assembly 20 of the invention, the colored light passes through the aperture to illuminate an imaging area of the SLM assembly 20 which selectively transmits portions of the colored light to create image-beating light.

In an alternative embodiment of the invention, the negative carder 18 is replaced with a SLM carder which performs a similar function to that of the negative carder 18 and has an aperture size larger than the standard negative carder 18 but still smaller than an area of the diffuser 46. This allows more light to pass through into the SLM assembly 20 which can now have greater dimensions than that of a standard film format, a 35 mm negative, for example.

The light passing through the SLM assembly 20 creates the image-beating light which then passes into the lens system 26 containing an enlarging lens 48. One skilled in the art will realize that the enlarging lens 48 can be replaced by multiple lenses in the lens system 26 and can be used for reducing, transmitting, or enlarging the image.

The enlarging lens 48 determines an amount of enlargement of the image onto photographic paper. A standard set of lenses for the conventional photographic printer includes lenses to enlarge a photographic negative to standard photograph sizes of 3½"×5", 4"×6", 5"×7". Along with an amount of enlargement, the lens itself is chosen dependent upon a thickness and dimensions of a negative or, in this case, the SLM assembly 20. If the SLM assembly 20 is thicker or has different dimensions than the conventional photographic negative then the enlarging lens 48 must be changed or an additional lens must be added to accommodate the dimensional difference. For thickness changes, the lens is changed to accommodate a displacement of focal planes of the negative versus the SLM assembly 20.

In one embodiment of the invention, the thickness and dimensions of the SLM assembly 20 are chosen to accommodate the standard lens sizes, in that the thickness and dimensions are substantially identical to that of the photographic negative.

Alternatively, the thickness and dimensions are chosen to ensure that most of the standard lenses are utilized. For example, a thicker or dimensionally larger SLM assembly is chosen such that the use of the standard 4"×6" lens results in a print size of 3½"×5" and the 5"×7" lens results in a print size of 4"×6".

In a second embodiment of the invention, the enlarging lens 48 and the SLM assembly 20 are manufactured into one optical system 26. Inserting this optical system 26 automatically converts the minilab into an electronic image processing lab without additional changes required. In a third embodiment of the invention, the color filters 40, 42, 44 are also included into a single optical system as described above.

In either case, the image-bearing light having passed through the enlarging lens 48 is then presented upon a shutter 52. The shutter 52 is housed within the shutter unit 28 and is connected to a solenoid 50. The solenoid 50 is an assembly which is used as a switch, consisting essentially of a coil and a metal core free to slide along a coil axis under the influence of the magnetic field so as to selectively drive the shutter 52 to open and close. Thus, the shutter controls an amount of the image-bearing light passing therethrough. An amount of time that the shutter 52 is allowed to remain open determines exposure time of the image-bearing light onto photographic paper 54.

The photographic paper 54 is held within the paper mask 30 such that the image-bearing light is restricted to a selected area on the photographic paper producing a positive image thereon.

A fourth embodiment of the invention has the SLM assembly 20, the enlarging lens 48, and the shutter unit 28 manufactured into one optical assembly. This allows greater control over the imaging process by the computer 24 as the computer 24 can now control exposure time.

In practice, the computer 24 feeds the electronic image signal to the photographic printer 10 in three distinct steps. The original electronic image signal is divided into three color planes corresponding to red, green and blue. The red color plane is loaded into the SLM assembly 20 and the photographic paper 54 is then exposed through the SLM assembly 20, the magenta filter 42, and the yellow filter 40 for a desired amount of time. Only red sensitive layers of the photographic paper 54 are now exposed.

Next the green color plane is loaded into the SLM assembly 20 and the photographic paper 54 is exposed through the SLM assembly 20, the yellow filter 40 and the cyan filter 44. Thus the photographic paper 54 is now exposed for both the red and green sensitive layers.

Finally, the blue color plane is loaded into the SLM assembly 20. The photographic paper 54 is exposed through the SLM assembly 20 and the cyan filter 44 and the magenta filter 42.

All three layers of the photographic paper are now exposed in red, green and blue and the paper is then ready for chemical processing.

Figure 3:
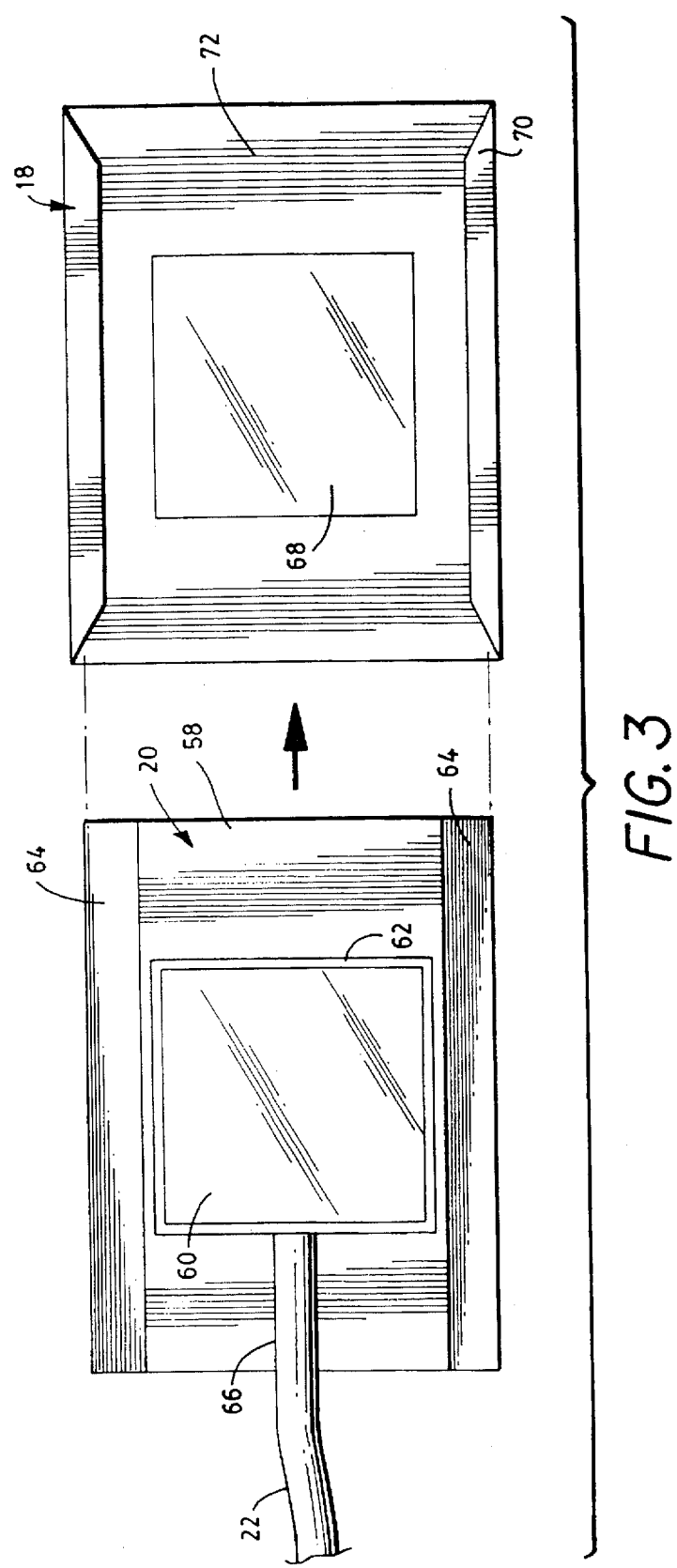
FIG. 3 is an exploded view of a negative carrier and spatial light modulator assembly in accordance with the invention as shown in FIG. 1.

Referring now to FIG. 3, the negative carrier 18 and the SLM assembly 20 are shown in detail. The SLM assembly 20 includes as major components an adapter 58 and an SLM 60. The adapter 58 is designed to mechanically interconnect with the negative carrier 18 such that the adapter 58 is held firmly in position during photographic imaging. The adapter 58 has opposed grooves 64 that adapt a thickness of the SLM assembly 20 down to an approximate thickness of a photographic negative. This allows the adapter 58 to pass freely through the negative carrier 18 so that the SLM assembly 20 can be removably and replaceably inserted into the photographic primer 10. One skilled in the art will realize that various other mechanical interconnections can be utilized for differing models of the photographic printer.

In the preferred embodiment, the SLM 60 is an active matrix spatial light modulator that is a liquid crystal matrix of individual pixels which are each selectively changeable between light transmissive and light blocking states in graduated steps called gray levels. The SLM 60 has a matrix of 1024 by 1440 pixels each incorporating 256 gray levels to provide a resolution similar to that of high definition television. Those skilled in the art appreciate that an exposure can be achieved with an SLM matrix which has more or less pixels than that described and with more or less gray levels impacting only a look of the final printed image and not the invention itself.

While the number of pixels in the matrix is determined by the properties of available SLM's, the gray levels are dependent also upon a driver from the computer 24. In the preferred embodiment, a commercially available 8-bits VGA driver board is used to generate 256 shades of gray at the output of the SLM 60. These shades of gray are non-linearly spaced with respect to numerical representations of digital inputs to the VGA driver board. This nonlinear relationship is designed for direct display to the human eye, and therefore, is appropriate for viewing but not for printing since eye characteristics are different than characteristics of photographic paper. Specifically, the 256 evenly spaced levels generated by the VGA driver board to drive the SLM translate to 256 non-evenly spaced optical densities on the photographic paper with a poor quality of print as a result.

To transform this system to a high quality print, at least 8 bits, i.e. $2^8=256$, evenly spaced optical densities must be produced onto the photographic paper. Mapping an 8-bits output through a non-linear function presents multiple maps to input points between integer input values. Rounding the input value reduces print quality and, therefore, is avoided. Instead, 10 to 12 bit linearly spaced exposure values are used to compensate for the nonlinear characteristic of the paper. To achieve the 10 to 12 bit linearly spaced exposure values with 8-bits VGA board driving the SLM 60, multiple exposure is used.

The simplest form of a multiple exposure is a binary exposure. For example, 10-bits per color requires exposing the film 10 times per color plane. Each exposure in sequence would have to be two times longer than the previous exposure. Only a one-bit (i.e. two gray levels) SLM system would be necessary, but print speed would be slower unless the shutter speed is very fast to accommodate the shortest exposure time. This can require changing a shutter in the photographic printer.

To increase print speed without changing the shutter, a number of bits exposed at a given time could be increased. But, multiple exposures other than binary require a linear exposure system. The nonlinear characteristics of the SLM 60 can be linearized by applying a look-up table ("LUT") to the digital image signal to yield a linear exposure system.

In the preferred embodiment in which the print speed is important and the shutter speed cannot be increased beyond a fixed maximum speed without replacing the shutter, only two exposures per color, 5 bits each, is utilized to achieve 10 equally spaced exposure levels. The linearizing LUT in front of the 8-bits VGA board is programmed such that the 5 bits ($2^5=32$ equally spaced numbers) at the input of the composite exposure system correspond to 32 linearly spaced transmittances of the SLM. This creates a linear exposure system.

During the printing, first, the 5 least significant bits are used to make a first exposure. Subsequently, the next 5 bits, or most significant bits, are applied to the exposure system. The second exposure lasts $2^5=32$ times longer. That way a 10-bit resolution linear exposure system is achieved with 8-bit nonlinear SLM system and a double exposure per color.

One skilled in the art will realize from the above description that other combinations of number of exposures and bits in the exposures can be used as long as their sum adds to 10. For example, a 5-bits exposure followed by five binary exposures could be used.

Surrounding the SLM active area is a rim 62 of matrix electronics which govern individual addressing of the pixels within the matrix. The matrix electronics are in turn controlled by the computer 24. The cable 22 is held in position in the adapter by a conduit 66.

The SLM assembly 20 slides into the negative carrier 18 such that the grooves 64 pass under clamping portions 70 of the negative carrier 18 and into alignment with an aperture 68 such that light passing through the aperture 68 is allowed to pass through the active area of the spatial light modulator 60 to create image-bearing light.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An apparatus, suitable for use with a photographic printer, for printing an image corresponding to an electronic image signal onto a photosensitive medium, where the photographic printer, when operating, projects a beam of light through a negative holder, said apparatus comprising:

image source means for transmitting the electronic image signal;

an adapter removeably insertable into the negative holder spatial light modulation means disposed within said adapter, said spatial light modulation means further electrically connected to said image source means, such that said spatial light modulation means responds to the electronic image signal and forms the image in the path of the beam of light, thereby providing image-bearing light to expose the image onto the photosensitive medium; and color filter means electrically connected to said image source means, for selectively altering a color of said beam of light such that colored image-bearing light is projected onto the photosensitive medium.

2. The apparatus according to claim 1 wherein said spatial light modulation means comprises a matrix of individually addressable pixels, each of said individually addressable pixels corresponding to a location on the photosensitive medium such that the locations are two-dimensionally contiguous to form the image on the photosensitive medium with a single exposure.

3. The apparatus according to claim 1 wherein said image source means further comprises time modulation means for transmitting multiple subsets of data representing the image, where said multiple subsets are divided by gray level, and an exposure time for each consecutive subset is changeable for each consecutive subset.

4. The apparatus according to claim 1 wherein said image source means further comprises linearizing means for applying a transform function to the electronic image signal to compensate for non-linearities in said spatial light modulation means or in the photosensitive medium.

5. A system for printing an image on a photosensitive medium, said system comprising:

a light source projecting a beam of light;

a negative carrier disposed in said beam of light, said negative carrier comprising an aperture which allows said beam of light to pass therethrough;

an electronic image source adapted to transmit an electronic image signal representative of said image;

spatial modulation means disposed within said negative carrier aperture, said spatial light modulation means electrically connected to said electronic image source such that there is formed an image in said spatial light modulation means in response to the electronic image signal, and the image is projected in image-bearing light;

color filter means electrically connected to said electronic image source, for selectively altering a color of said beam of light such that a color image is projected onto the photosensitive medium; and optical means for directing said image-bearing light onto the photosensitive medium and for controlling the exposure time of the image-bearing light thereby printing the image.

6. The apparatus according to claim 5 wherein said spatial light modulation means comprises:

a housing formed to be secured within said negative carrier with an interference fit;

said spatial light modulation means further being disposed in optical alignment with said negative carrier aperture, for selectively altering a matrix of pixels according to said electronic image signal to form a negative of the image thereon thereby selectively altering the beam of light passing therethrough to form the image upon said photosensitive medium.

7. The apparatus according to claim 6 wherein said electronic image source further comprises linearizing means for applying a transform function to said electronic image signal to compensate for non-linearities in said spatial light modulation means and in the photosensitive medium.

8. The apparatus according to claim 5 wherein said spatial light modulator means is combined with said optical means to form a single optical system electrically connected to said electronic image source, to image the electronic image signal onto the photosensitive medium where said electronic image source transmits the image to said single optical system thereby said single optical system to expose the photosensitive medium.

9. An apparatus for allowing a conventional film printer, which has a light source projecting image-bearing light through an aperture in a negative carrier into a first lens system which presents the image-bearing light onto a photographic medium, to print an electronic image signal from a computer for a period of time controlled by a first shutter system, said apparatus comprising:

spatial light modulation means formed to be secured within the negative carrier in optical alignment with the aperture, said spatial light modulation means further being in electrical communication with the computer such that the electronic image signal is imprinted on the spatial light modulation means to form an image thereon thereby selectively allowing the image-bearing light to pass therethrough to render said image upon said photographic medium; and color filter means electrically connected to the computer, for selectively altering a color of the image-bearing such that a color imagine is projected onto the photographic medium.

10. The apparatus according to claim 9 further comprising a second lens which compensates for optical variations between said spatial light modulation means and a conventional photographic negative.

11. The apparatus according to claim 10 wherein said second lens focuses said image-bearing light upon the photographic medium in conjunction with said first lens.

12. The apparatus according to claim 10 wherein said second lens is operative, after removal of said first lens, to focus said image-bearing light upon the photographic medium.

13. The apparatus according to claim 9 wherein said spatial light modulation means further comprise a second shutter which has a first and a second position, the first position being operative for blocking essentially all image-bearing light from impinging upon the photographic medium, and further being operative to move to said second position to allow said image-bearing light to expose the photographic medium and then returning to said first position, and said second shutter being operative between the first and second positions when said first shutter is fully open.

14. The apparatus according to claim 9 wherein said spatial light modulation means further comprises time modulation means for increasing a number of gray scales in the image printed on the photographic medium by subdividing the electronic image signal and transmitting a first group of least significant bits of the electronic image signal to initially expose the photographic medium, and then transmitting a second group of more significant bits of the electronic image signal to further expose the photographic medium, where exposures from the first and second groups merge on the photographic medium to form an integrated image.

15. The apparatus according to claim 14 wherein said time modulation means further comprises at least a third group of more significant bits of the electronic image signal such that exposure of said at least a third group merges with said first and second groups on the photographic medium to increase the number of gray scales.

16. An apparatus suitable for use with a conventional photographic printer, for printing an image corresponding to an electronic image signal onto a photographic medium where the conventional photographic printer, when operating, projects a beam of light through a negative holder, the beam of light then being altered by the recorded image to produce image-bearing light which passes through an optical assembly having at least a first and second removable and replaceable lens for altering magnification to expose a first and a second photographic print size, respectively, on the photographic medium, said apparatus comprising:

computer means for processing and transmitting the electronically generated image;

an adapter removably insertable into the negative holder of the conventional photographic printer;

spatial light modulation means secured within said adapter and electrically connected to said computer means, said spatial light modulation means for selectively transmitting and altering the beam of light to form the image-bearing light such that the electronically generated image is imprinted on said spatial light modulation means and is thereby projected in image-bearing light; and color filter means electrically connected to said computer means, for selectively altering a color of said beam of light such that a color image is projected onto the photographic medium.

17. The apparatus according to claim 16, said apparatus comprising dimensions such that the first lens projects the image onto the photographic medium as a print substantially equal to that of the first print size, and the second lens projects the image onto the photographic medium as a print substantially equal to that of the second print size.

18. The apparatus according to claim 16, said apparatus comprising dimensions such that the second lens projects an image onto the photographic medium as a print substantially equal to that of the first print size.

19. An adapter for allowing a conventional film printer having a light source projection image-bearing light through an aperture in a negative carrier into a first lens system which presents the image-bearing light onto a photographic medium to print electronic image signal from a computer for a period of time controlled by a first shutter system, said adapter comprises:

spatial light modulation means formed to be secured within the negative carrier in optical alignment with said aperture, the spatial light modulation means in electrical communication with said computer such that the electronic image signal is imprinted on the spatial light modulation means forming an image thereon thereby selectively allowing the image-bearing light to pass therethrough to render said image upon said photographic medium; and modulation means for increasing a number of gray scales in the image printed on the photographic medium by subdividing the electronic image signal and transmitting a first group of least significant bits of the electronic image signal to expose the photographic medium and then transmitting a second group of more significant bits of the electronic image signal to expose the photographic medium where exposures from the first and second groups merge on the photographic medium to form an integrated image.

\* \* \* \* \*